(12) United States Patent
Groff et al.

(10) Patent No.: US 6,433,830 B1
(45) Date of Patent: Aug. 13, 2002

(54) OFF-AIR PHASE LOCK TECHNIQUE

(75) Inventors: Donald Groff, Hatfield; Edgar Rhodes, Silverdale, both of PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/332,771

(22) Filed: Jun. 14, 1999

(51) Int. Cl.[7] .............................................. H04N 5/073
(52) U.S. Cl. ........................ 348/536; 348/537; 348/724; 348/731; 332/127; 332/151; 375/327; 455/113
(58) Field of Search ................................ 348/536, 537, 348/544, 724, 731, 735, 723, 725, 726; 375/306, 327, 344; 332/127, 162, 151; 455/102, 113, 118, 136, 139; H04N 5/073, 5/40

(56) References Cited

U.S. PATENT DOCUMENTS

| | | | |
|---|---|---|---|
| 3,898,566 A | | 8/1975 | Switzer et al. .............. 325/308 |
| 4,041,533 A | * | 8/1977 | Yamamoto et al. ......... 348/536 |
| 4,099,123 A | | 7/1978 | Finlay et al. ............... 325/308 |
| 4,962,529 A | * | 10/1990 | Saeki et al. .................... 380/15 |
| 5,038,404 A | | 8/1991 | Marz .......................... 455/118 |
| 5,079,525 A | * | 1/1992 | Ishikawa et al. ............ 332/120 |
| 5,125,100 A | * | 6/1992 | Katznelson ................. 455/6.1 |
| 5,416,527 A | * | 5/1995 | Casey ......................... 348/537 |
| 5,467,141 A | * | 11/1995 | Ligertwood ................. 348/555 |
| 5,504,464 A | * | 4/1996 | Hwang ....................... 332/127 |
| 5,506,627 A | * | 4/1996 | Ciardi ........................ 348/515 |
| 5,541,671 A | * | 7/1996 | Pugel ......................... 348/724 |
| 5,671,253 A | * | 9/1997 | Stewart ...................... 375/316 |
| 5,699,385 A | * | 12/1997 | D'Sylva et al. ............. 375/344 |
| 5,748,261 A | * | 5/1998 | Pugel ......................... 348/724 |
| 5,933,460 A | * | 8/1999 | Lee ............................. 375/324 |
| 5,959,682 A | * | 9/1999 | Kim et al. ................... 348/511 |
| 5,970,053 A | * | 10/1999 | Schick et al. ............... 370/252 |
| 6,115,431 A | * | 9/2000 | Lee ............................. 375/324 |
| 6,118,497 A | * | 9/2000 | Pugel ......................... 348/723 |

* cited by examiner

*Primary Examiner*—Jean W. Désir
(74) *Attorney, Agent, or Firm*—Mayer Fortkort & Williams, PC; Karin L. Williams, Es

(57) ABSTRACT

The proposed phase lock technique uses various feedback loops to lock the frequency and phase of a CATV modulator output signal to that of an off-air signal without directly measuring the output frequency. One embodiment includes a tuner for receiving the off-air signal and generating an intermediate frequency signal and a phase-frequency detector for comparing the frequency and phase of the intermediate frequency signal generated by the tuner with the frequency and phase of an intermediate frequency signal generated by the modulator based on a reference input signal. The output of the phase-frequency detector is used to control the reference input signal into the modulator and the reference input signal to the tuner such that the frequency and phase of the modulator output signal is locked to the frequency and phase of the received off-air signal. A second embodiment uses two tuners with a common reference frequency and a third embodiment eliminates the need for a tuner, using direct counting of the broadcast signal to derive the modulator reference signal.

18 Claims, 5 Drawing Sheets

(a)
211.251 MHz OFF-AIR FREQUENCY
257 MHz, NOMINAL LO FREQUENCY 12000.00 kHz, ACTUAL VCXO FREQUENCY 45.749 MHz, IF FROM TUNER          45.75 MHz, CW FROM MODULATOR
714.828 kHz, COMP INPUT TO PC      714.844 kHz, SIG INPUT TO PC 0.016 > 0 HERE WILL INCREASE VCXO (b)
211.251 MHz OFF-AIR FREQUENCY
257 MHz, NOMINAL LO FREQUENCY 12000.06 kHz, ACTUAL VCXO FREQUENCY 45.750285 MHz, IF FROM TUNER       45.75023 MHz, CW FROM MODULATOR
714.848 kHz, COMP INPUT TO PC      714.847 kHz, SIG INPUT TO PC

-0.001 > 0 HERE WILL INCREASE VCXO

FIG. 3

OFF-AIR PHASE LOCK TECHNIQUE

FIELD OF THE INVENTION

This invention relates to an off-air phase lock technique for cable television systems which use modulators for cable channels and, more particularly, relates to an apparatus, system and method for providing off-air phase lock capability that allows locking the frequency and phase of a CATV modulator output signal to that of an off-air signal.

BACKGROUND OF THE INVENTION

Cable television systems may transmit television signals at the same frequencies as broadcast television signals. Accordingly, it is possible, if not probable, that a television receiver will pick up the broadcast television signal (i.e. the off-air signal) directly and will also receive the transmitted channel over the cable system. The signals at the same frequency may carry the same material (e.g., broadcast channel 7 will transmit the same information as cable transmitted channel 7). If television stations are carried at the same frequency on cable as broadcast, the off-air broadcast signals may interfere with the cable signals, causing lines and beats to appear in the picture. Phase-locking the two signals reduces the effects of interference.

In a cable television "processor", a broadcast television channel may be converted to an intermediate frequency for controlling its level and frequency response. The signal is then typically converted back up, possibly to a different channel, for transmission on a cable television system. In this type of conventional system, it is not difficult to provide phase lock between the input and output frequencies. This occurs when the broadcast and cable channels are at the same frequency, and the solution is to use the same local oscillator for both conversions, as shown in FIG. 1. More specifically, in FIG. 1, the broadcast television channel signal is received by a first converter (mixer) 10. Local oscillator 30 generates a signal for mixer 10 which mixes with the off-air signal so that the off-air signal is converted to an intermediate frequency (IF) signal and is provided to the cable television processor. The signal is then received by a second converter (mixer) 20 which converts the intermediate frequency signal back up to an RF frequency for transmission. Since both converter (mixer) 10 and converter (mixer) 20 are controlled by the same local oscillator 30, the input off-air signal frequency and the CATV processor output frequency are "phase locked".

However, the conventional phase lock method described above fails to meet the demands of current cable systems. Present day cable systems now normally use modulators for all cable channels (one modulator per channel), for a variety of performance reasons. The modulator converts standard base band audio and video signals into RF signals, assigns them a channel, and sends them onto the cable distribution system. In this case, such direct control of frequency and phase is not possible, and other means must be found. Present day modulators normally are frequency-agile, capable of producing an output on any cable television channel, and are provided with a reference frequency input. This input is normally used in cases where it is desired to make the outputs of a number of modulators coherent in frequency, for control of distortion products.

Accordingly, it is desired to provide a technique that phase-locks two signals such that the signal on the cable system is at exactly the same frequency as the corresponding off-air signal (i.e., to ensure that the two signals are coherent, i.e. at the same frequency and phase). To provide the coherent feature, the two signals must be phase-locked, thereby ensuring that they are at the same frequency and mining the effects of interference.

SUMMARY OF THE INVENTION

The present invention provides an off-air phase lock technique that allows locking both the frequency and phase of a CATV modulator signal to that of an off-air signal so as to reduce interference between the two signals.

In accordance with one embodiment of the invention, the phase lock apparatus accomplishes the frequency and phase signal lock by using a tuner, for receiving the off-air signal and generating an intermediate frequency signal, and a phase-frequency detector, for comparing the frequency and phase of the signal generated by the tuner with the frequency and phase of a signal generated by the modulator based on a reference input signal. The output of the phase-frequency detector is then used to control the reference input signal into the modulator and the reference input signal into the tuner, such that the frequency and phase of the modulator RF output signal is locked to the frequency and phase of the received off-air signal.

In a second embodiment of the invention, the phase lock apparatus locks the frequency and phase of the modulator RF output signal to that of the off-air signal using a channel selection filter and a frequency divider. The divider divides the frequency of the off-air signal, from the channel selection filter, into a first common frequency signal, and a phase-frequency detector compares the frequency and phase of the first common frequency signal with the frequency and phase of a second common frequency signal generated from a reference input signal provided to the modulator. The output of the phase-frequency detector is then used to control the reference input signal provided to the modulator, such that the frequency and phase of the modulator RF output signal is locked to the frequency and phase of the received off-air signal.

Finally, in a third embodiment of the invention, the phase lock apparatus locks the frequency and phase of the CATV modulator RF output signal to that of an off-air signal by receiving the off-air signal at a first tuner and generating an intermediate frequency signal, and receiving the CATV modulator RF signal at a second tuner and generating an intermediate frequency signal, the second tuner having a common reference input frequency with the first tuner. A phase-frequency detector is provided for comparing the frequency and phase of the intermediate frequency signal generated by the first tuner with the frequency and phase of the intermediate frequency signal generated by the second tuner, and the output of the detector is used to control the reference input signal into the modulator.

The above-mentioned and other features and advantages of the present invention will become more apparent from the following detailed description when taken in conjunction with the accompanying drawings.

BRIEF DESCRIPTION OF THE DRAWINGS

In the drawings,

FIG. 3 is a numerical example of the operation of the proposed off-air phase lock technique;

DETAILED DESCRIPTION

Figure 1:
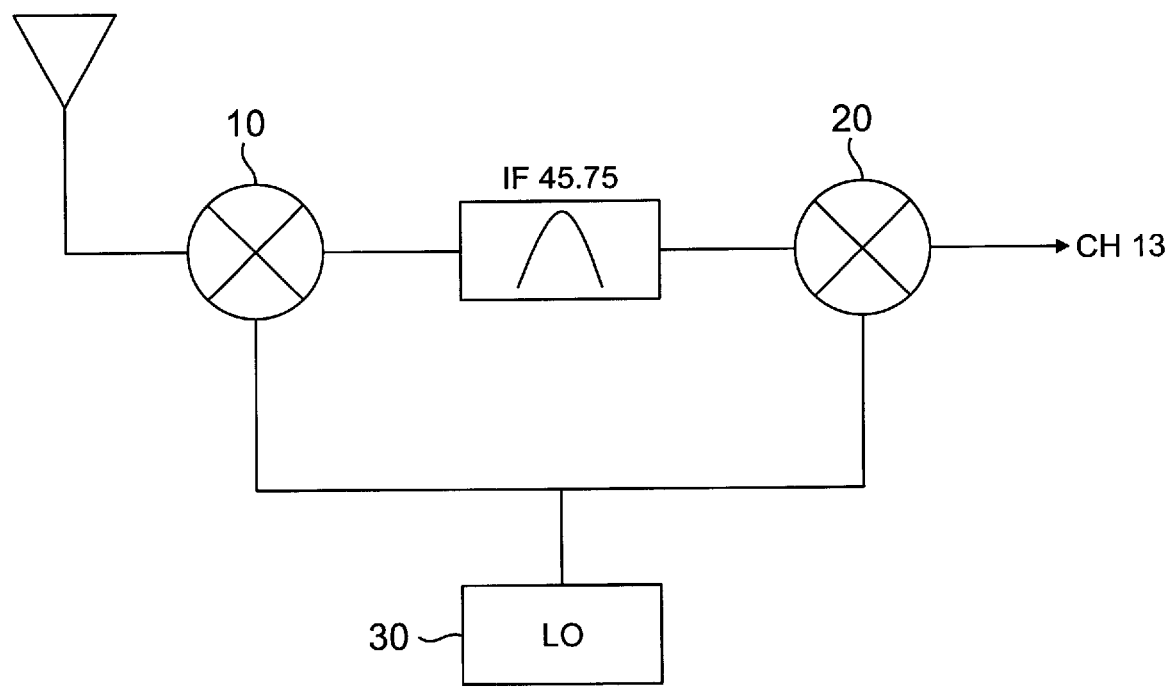
FIG. 1 is a block diagram illustrating an off-air phase-lock technique in accordance with a conventional method.

While this invention is susceptible of embodiment in many different forms, there is shown in the drawings and will herein be described in detail, specific embodiments, with the understanding that the present disclosure is to be considered as an example of the principles of the invention and not intended to limit the invention to the specific embodiments shown and described.

The proposed phase-lock techniques ensure that two signals are phase-locked and therefore are at the same frequency and are coherent.

In a first embodiment, the proposed off-air phase lock technique compares an IF signal output from a modulator with an IF signal from a tuner. More specifically, turning now to FIG. 2, which provides a block diagram of the first proposed off-air phase lock technique, modulator 10 is a typical television signal modulator for cable television applications. Modulator 10 includes a reference input, a CW output (which provides an unmodulated picture IF carrier) and an RF output (i.e., the RF channel output, on which the modulator video and audio carrier signals appear). It will be appreciated by those skilled in the art that the modulator may offer a wide frequency range (e.g. 50 MHz to 1 GHz) and that all standard frequencies (STD, HRC or IRC per EIA standard EIA-542) may be available from modulator 10 by either keying in the frequency or using channel maps (i.e., the modulator may be able to generate signals on any selected channel using any one of the channel conventions, and thus is "agile").

As shown, the off-air signal is received by tuner 20, which converts the off-air signal to an intermediate frequency (IF) signal. The IF signal from tuner 20 is provided to phase-frequency detector 30, as is the IF signal output from modulator 10. Phase-frequency detector 30 compares the two signals and provides a voltage error signal to loop filter 40. The signal from loop filter 40 is then provided to a voltage controlled oscillator 50 which provides the necessary reference signals to both modulator 10 and tuner 20 (e.g., the Reference Input signal to modulator 10 may be 6 MHz, the reference input to tuner 20 may be 4 MHz, the CW (IF) output signal from modulator 10 may be a 45.75 MHz carrier signal and the signal IF output from tuner 20 may also be 45.75 MHz, the RF output signal thereby phase-locked to the off-air signal).

As described above, the tuner IF, the CW output from the modulator, and the RF output from the modulator are each coherent with the reference signals provided through the loop. Accordingly, the loop functions to maintain phase-lock between the RF output of the modulator and the off-air signal thereby reducing the effects of interference.

Figure 2:
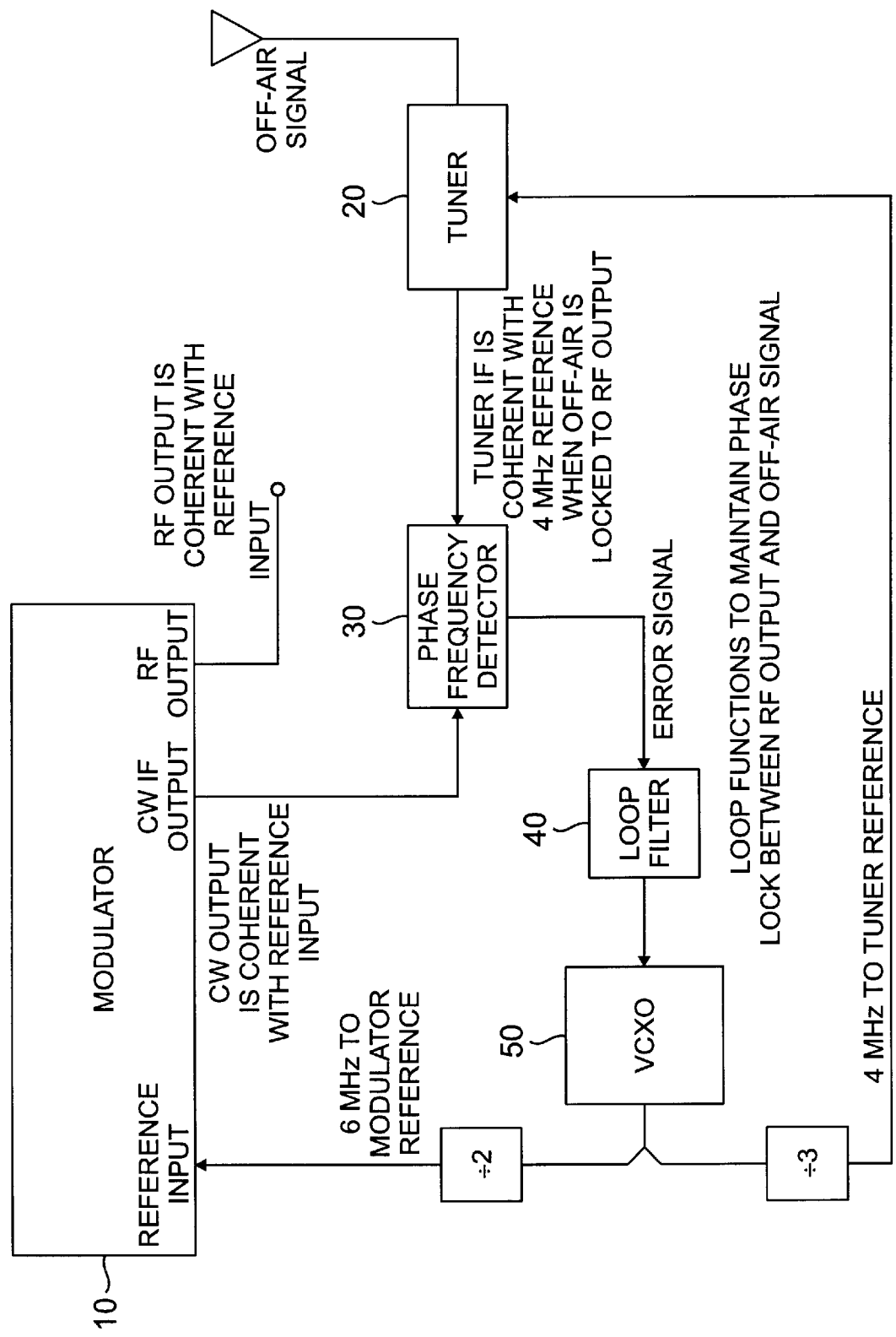
FIG. 2 is a block diagram illustrating an off-air phase-lock technique in accordance with a first embodiment of the invention.

Although FIG. 2 illustrates a 12 MHz VCO, which is then divided by 2 to produce a standard 6 MHz reference input to the modulator 10 and is divided by 3 to produce a 4 MHz reference input to the tuner 20, it will be appreciated by those skilled in the art that each of these components may be changed to provide any necessary reference signals to the modulator 10 and tuner 20.

FIG. 3 provides a numerical example of the operation of the proposed off-air phase lock technique with reference to the block diagram of FIG. 2. First, in FIG. 3(a), assuming that the off-air signal frequency is 211.251 MHz (corresponding to Channel 13 under the STD and EIA plans), and tuner 20 has a nominal LO frequency of 257 MHz, the CW (IF) output from tuner 20 was 45.749 MHz. The CW (IF) output signal from modulator 10 was 45.750 MHz. These signals may be divided by 64 in frequency by a prescaling device. Accordingly, the COMP input to PC was 714.828 kHz and the SIG input to PC was 714.844 kHz.

In order to correct for the 211.251 off-air frequency, as shown in FIG. 3(b), the error signal generated and input to loop filter 40 increases the actual VCXO frequency 50 from 12000.00 kHz to 12000.06 kHz, thereby decreasing the difference between the CW (F) output signal from modulator 10 and the IF output signal from tuner 20 and maintaining phase lock between the modulator RF output and the off-air signal.

In a second embodiment of the invention, a broadcast RF signal and an RF signal output from a modulator may be directly compared. Although such a comparison is somewhat more complex and requires considerable hardware to provide the necessary filtering to compare an off-air signal with the RF output of a modulator, it can be used with modulators that do not have an intermediate frequency output. Again, this is to minimize possible visual interference at the subscriber television due to unintentional off-air reception of the local television station broadcast. This feature may also be used to minimize this type of interference to subscriber's television due to ingress in the cable system's distribution plant or subscriber's cable drop.

Figure 4:
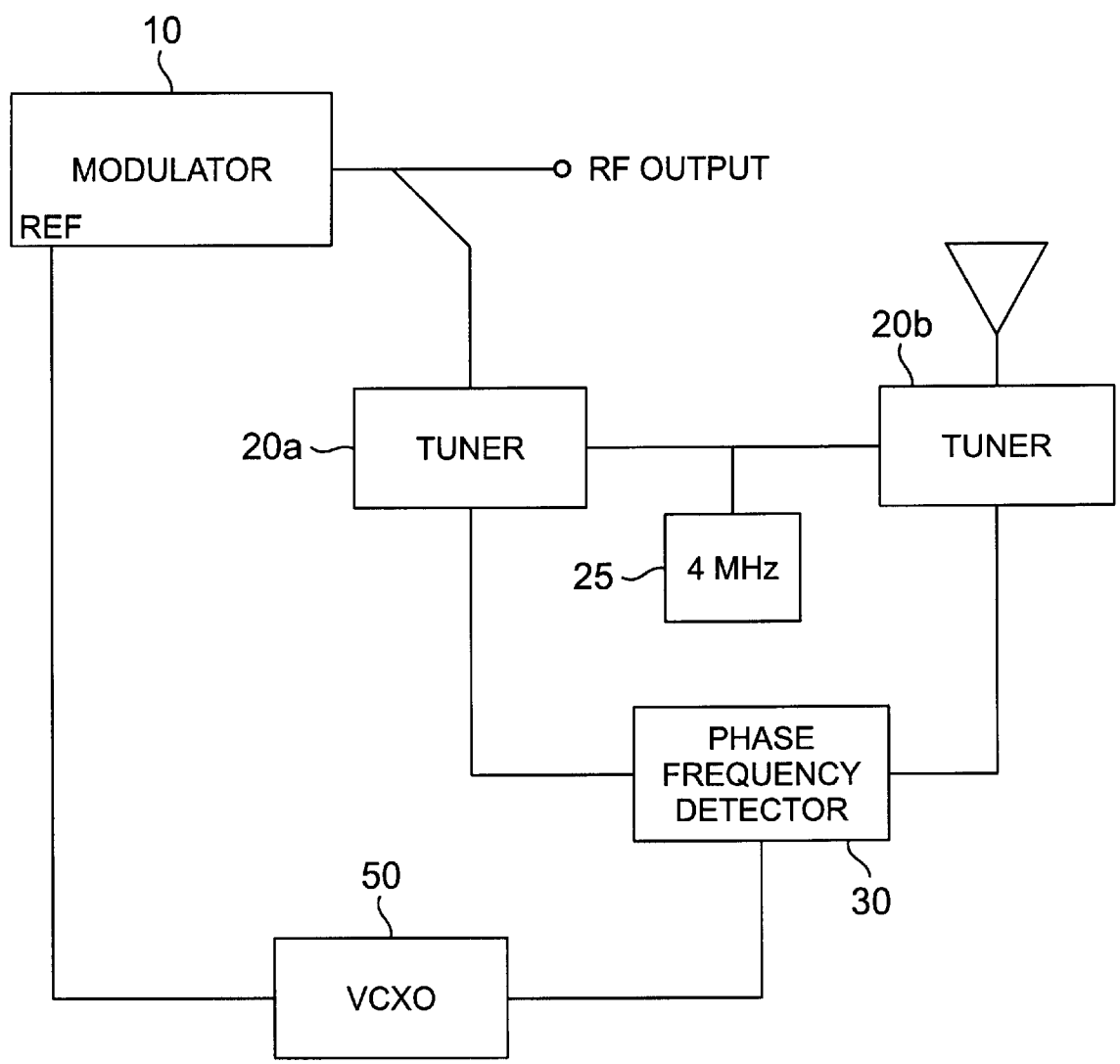
FIG. 4 is a block diagram illustrating an off-air phase-lock technique in accordance with a second embodiment of the invention.

Turning now to FIG. 4, an apparatus according to the second embodiment as shown is capable of two RF inputs. Specifically, one RF input is used to sample the RF output carrier frequency from the modulator to be phase-locked, and the other RF input is used to sample the off-air channel frequency to be used to phase-lock the output carrier frequency of the modulator. As shown, both the modulator RF output and the off-air broadcast signal are converted to the intermediate frequency. This requires two tuners, with a common reference frequency, and unlike the first embodiment described above, does not use the intermediate frequency generated by the modulator. More specifically, turning now to FIG. 4, the RF output from modulator 10 is provided to a first tuner 20a. The off-air RF signal is provided to a second tuner 20b. As shown a common reference frequency 25 (the shown 4 MHz is exemplary) is provided to tuners 20a and 20b. A phase frequency detector 30 receives the outputs from each of tuners 20a and 20b and provides an error signal to VCXO 50. Again, the output of VCXO is provided as a reference input to modulator 10.

Figure 5:
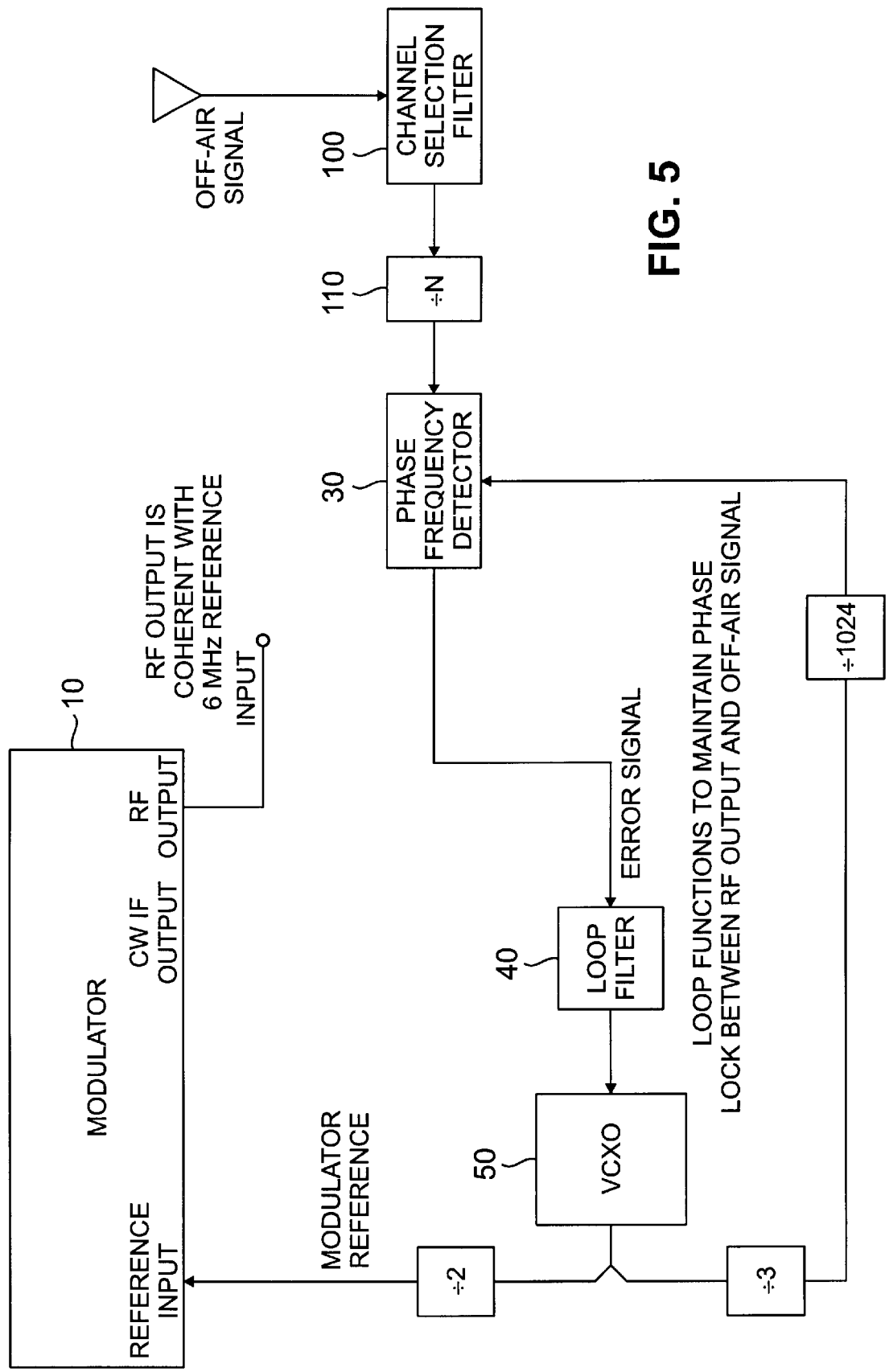
FIG. 5 is a block diagram illustrating an off-air phase-lock technique in accordance with a preferred third embodiment of the invention.

FIG. 5 provides a block diagram of yet another proposed off-air phase lock technique which, like the embodiments described above, controls the output frequency of a modulator without directly measuring the output frequency. In addition, like the first and second embodiments described above, the RF output from the modulator is coherent with the reference input, thereby ensuring that the off-air signal and the RF output signal are phase-locked and therefore are at the same frequency. However, the embodiment of FIG. 5 differs from the earlier embodiments in that it does not require a tuner and also, as in the second embodiment, does not use the CW output from the modulator. The removal of the tuner(s) from this embodiment provides an advantage in eliminating the significant phase noise in the IF output from the tuner. Accordingly the embodiment shown in FIG. 5 is more practical than those of FIGS. 2 and 4.

As shown in FIG. 5, this embodiment uses a channel selection filter 100 that receives the off-air signal. The filter then provides a signal that is divided by N (110), i.e. the broadcast frequency is divided down for a phase comparison (by phase-frequency detector 30) directly with the reference signal. The channel selection filter and the amplitude limiting function provided by the divide-by-N device also serve to remove the modulation from the off-air signal.

More specifically, as shown in the block diagram, direct counting of the broadcast signal is used to derive the reference signal for the modulator (e.g., 6 MHz as shown). In order to make the phase comparison, both inputs must be divided down to some common frequency. This may be done by dividing the 12 MHz VCXO clock 50 by 3072 (=3×1024 as shown for illustrative purposes) and dividing the input broadcast frequency by a number N that ranges from 14,144 to 50,080 (e.g., 64×221 to 64×845), to a comparison frequency of 3.90625 kHz. For example, for Channel 2 (55.25 MHz) the broadcast input could be prescaled by 64, then divided by 221, and for Channel 13 (211.25 MHz) the broadcast input could be divided by 845. It will be appreciated by those skilled in the art that these divisions are easily achievable with common integrated circuits. For example, the divisions are readily achieved in the Motorola MC12017 prescaler and MC145151 PLL frequency synthesizer.

Accordingly, as shown, each of the embodiments described herein control the frequency output of a modulator without directly measuring the frequency output based on the fact that the RF output is coherent with the reference input.

While various embodiments have been disclosed for purposes of illustration, those skilled in the art will recognize that the preferred embodiments may be altered and amended without departing from the true spirit and scope of the present invention as defined in the appended claims.

What is claimed is:

1. A phase lock apparatus, designed to work with a CATV modulator, for locking the frequency and phase of the CATV modulator RF output signal to that of an off-air signal, the phase lock apparatus comprising:
   a tuner for receiving the off-air signal and generating an intermediate frequency signal; and
   a phase-frequency detector for comparing the frequency and phase of the intermediate frequency signal generated by said tuner with the frequency and phase of an intermediate frequency signal generated by the modulator based on a reference input signal,
      wherein an output of the phase-frequency detector is used to control the reference input signal into the modulator and the reference input signal into said tuner, such that the frequency and phase of the modulator RF output signal is locked to the frequency and phase of the received off-air signal.

2. The apparatus according to claim 1, further comprising a loop filter for receiving the output of said phase-frequency detector.

3. The apparatus to claim 2, farther comprising an oscillator that receives an output signal from the loop filter, wherein the frequency of said oscillator is controlled in accordance with the received signal.

4. The apparatus according to claim 3, wherein the reference input signal into the modulator and the reference input into said tuner are both derived from the output of said oscillator.

5. A method for locking the frequency and phase of a CATV modulator put RF signal to that of an off-air signal, comprising the steps of:
   receiving the off-air signal and generating a first intermediate frequency signal in a tuner;
   comparing the frequency and phase of the first intermediate frequency signal with the frequency and phase of a second intermediate frequency signal generated by the modulator based on a reference input signal;
   controlling the reference input signal into the modulator based on a result of said comparing step; and
   controlling a reference input signal into the tuner based on the result of said comparing step,
      wherein the frequency and phase of the modulator output signal is locked to the frequency and phase of the received off-air signal.

6. The method according to claim 5, further comprising the step of receiving an output of said comparing step at a loop filter.

7. The method according to claim 6, further comprising the steps of:
   receiving an output signal from the loop filter at an oscillator; and
   controlling the frequency of the oscillator in accordance with the received signal.

8. The method according to claim 7, wherein the reference input signal into the modulator and the reference input into the tuner are each derived from the output of the oscillator.

9. A phase lock apparatus, designed to work with a CATV modulator, for locking the frequency and phase of the CATV modulator RF output signal to that of an off-air signal, the phase lock apparatus comprising:
   a first tuner for receiving the off-air signal and generating an intermediate frequency signal;
   a second tuner for receiving the CATV modulator RF output signal and generating an intermediate frequency signal, said second tuner having a common reference input frequency with said first tuner; and
   a phase-frequency detector for comparing the frequency and phase of the intermediate frequency signal generated by said first tuner with the frequency and phase of the intermediate frequency signal generated by said second tuner,
      wherein an output of said phase-frequency detector is used to control the reference input signal into the modulator such that the frequency and phase of the modulator RF output signal is locked to the frequency and phase of the received off-air signal.

10. The apparatus according to claim 9, further comprising an oscillator for receiving an output signal from the phase frequency detector, wherein the frequency of said oscillator is controlled in accordance with the received signal.

11. A method for locking the frequency and phase of a CATV modulator output RF signal to that of an off-air signal, comprising the steps of:
   receiving the off-air signal and generating a first intermediate frequency signal in a first tuner;
   receiving the modulator output RF signal and generating a second intermediate frequency signal in a second tuner;
   comparing the frequency and phase of the first intermediate frequency signal with the frequency and phase of the second intermediate frequency signal; and
   controlling a reference input signal into the modulator based on a result of said comparing step,
      wherein the first tuner and the second tuner share a common reference frequency, and further wherein the frequency and phase of the modulator output signal is locked to the frequency and phase of the received off-air signal.

12. The method according to claim 11, further comprising the steps of:
   receiving an output signal of said comparing step at an oscillator;
   controlling the frequency of the oscillator in accordance with the received signal; and
   providing a reference input signal to the modulator from the oscillator.

13. A phase lock apparatus, designed to work with a CATV modulator, for locking the frequency and phase of the CATV modulator RF output signal to that of an off-air signal, the phase lock apparatus comprising:
   a channel selection filter;
   frequency dividing means for converting the frequency of an off-air signal, from the channel selection filter, to a first common frequency signal; and
   a phase-frequency detector for comparing the frequency and phase of the common frequency signal generated by said frequency dividing means with the frequency and phase of a second common frequency signal generated from a reference input signal provided to the modulator,
      wherein an output of the phase-frequency detector is used to control the reference input signal provided to the modulator, such that the frequency and phase of the modulator RF output signal is locked to the frequency and phase of the received off-air signal.

14. The apparatus according to claim 13, further comprising a loop filter for receiving the output of said phase-frequency detector.

15. The apparatus to claim 14, further comprising an oscillator for receiving an output signal from the loop filter, wherein the frequency of said oscillator is controlled in accordance with the received signal.

16. The apparatus according to claim 15, wherein the reference input signal into the modulator and the second common frequency signal provided to said phase frequency detector are each derived from the output of said oscillator.

17. The apparatus according to claim 16, wherein the output of said oscillator is provided to frequency division means, the output of the frequency division means being the second common frequency signal provided to said phase frequency detector.

18. A method for locking the frequency and phase of an off-air signal to a reference signal provided to a CATV modulator, comprising the steps of:
   receiving the off-air signal at a channel selection filter;
   generating a first signal that is the off-air signal divided by N;
   providing the first signal to one input of a phase-frequency detector; and
   comparing the frequency and phase of the first signal with the frequency and phase of a signal derived from a signal used as a reference input signal for the CATV modulator.

* * * * *

UNITED STATES PATENT AND TRADEMARK OFFICE
CERTIFICATE OF CORRECTION

PATENT NO.    : 6,433,830 B1   Page 1 of 1
DATED         : August 13, 2002
INVENTOR(S)   : Donald Groff et al.

It is certified that error appears in the above-identified patent and that said Letters Patent is hereby corrected as shown below:

Column 1,
Line 39, after "off-air" (second occurrence) insert -- RF --.

Column 2,
Line 3, change "mining" to -- minimizing --.

Column 4,
Line 14, change "(F)" to -- (IF) --.

Column 5,
Line 57, change "farther" to -- further --.
Line 66, change "put" to -- output --.
Line 57, after "apparatus", insert -- according --.

Column 8,
Line 4, after "apparatus", insert -- according --.

Signed and Sealed this

Thirty-first Day of December, 2002

JAMES E. ROGAN
*Director of the United States Patent and Trademark Office*